Aug. 17, 1926.

I. BROBERG ET AL 1,596,697

LOCOMOTIVE AND SIMILAR VEHICLE

Filed April 21, 1925    2 Sheets-Sheet 1

Inventors
I. Broberg
G. Wahlsten
F. Ljungström
By Marks Clerk
Attys.

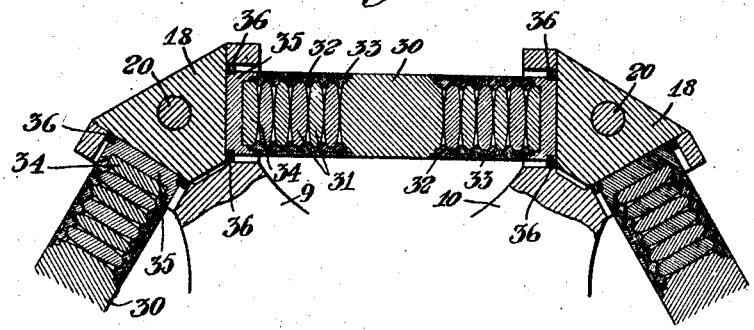
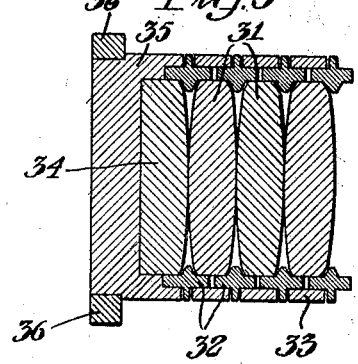

Patented Aug. 17, 1926.

1,596,697

UNITED STATES PATENT OFFICE.

ISIDOR BROBERG, GÖSTA WAHLSTEN, AND FREDRIK LJUNGSTRÖM, OF LIDINGO-BREVIK, SWEDEN, ASSIGNORS TO AKTIEBOLAGET LJUNGSTRÖMS ÅNGTURBIN, OF LIDINGO-BREVIK, SWEDEN, A CORPORATION.

LOCOMOTIVE AND SIMILAR VEHICLE.

Application filed April 21, 1925, Serial No. 24,870, and in Sweden April 30, 1924.

In locomotives and similar vehicles in which the driving motor is rigidly connected with the frame and connected with the driving wheels by means of a toothed gearing, it has been proposed to provide means, for instance a sleeve about the driving wheel axle, said means being movably connected on the one hand with the toothed gearing and on the other hand with the driving wheel axle, for the purpose of permitting the adjustability of the toothed gearing in relation to the driving wheel axle.

The present invention relates to locomotives of the type described and refers to an arrangement whereby the said adjustability of the toothed gearing in relation to the driving wheels may be permitted. The invention consists in that the movable coupling arranged between said means or sleeve and the toothed gearing and driving wheel axle respectively is effected by lengthened members, for instance links or rods, movably connected on the one hand with said means, and on the other hand with the driving wheel axle or the toothed gearing respectively and so arranged that transmission of power between the parts with which the members are movably connected is effected through said members in the direction of their length.

Figure 1:
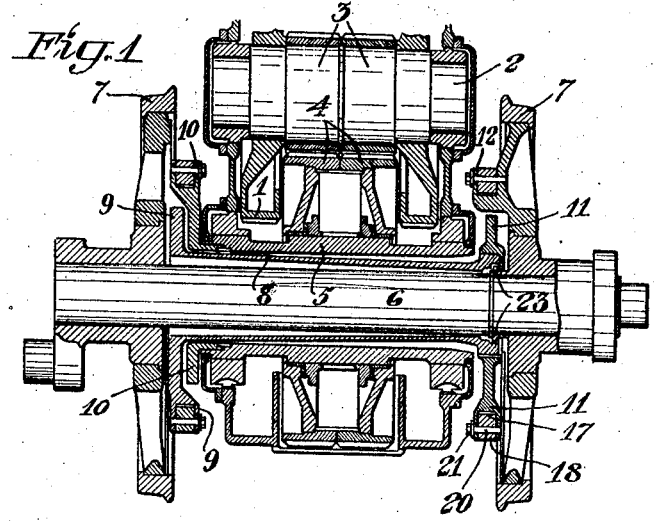
Figure 2:
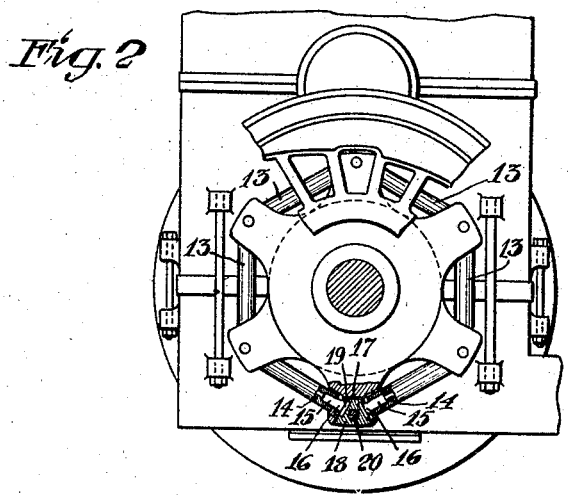
Figure 3:
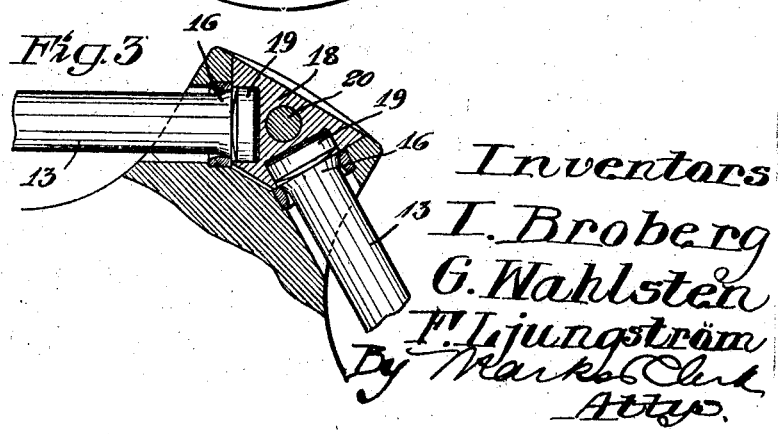

The invention is illustrated in the accompanying drawing. Fig. 1 shows a section of the lower portion of a toothed gearing for a locomotive according to the present invention. Fig. 2 represents a side view of the portion of the toothed gearing shown in Fig. 1, a part of the driving wheel being cut away. Fig. 3 shows another embodiment of the links on an enlarged scale. Fig. 4 shows a further embodiment of a supporting link and parts belonging thereto. Fig. 5 shows the one end of a supporting link on an enlarged scale.

In the embodiment shown in Figs. 1 and 2, the turbine (not shown) is connected by means of pinions and toothed gears with the gears 1 fixed on the shaft 2. Secured on the same shaft 2 is a smaller double pinion 3 meshing with the last and slowest running double toothed gear 4 of the gearing. Said gear 4 is fixed on the hollow shaft 5 surrounding the driving wheel axle 6 on which the driving wheel 7 are fixed from which the power may be transmitted to other driving wheels by means of cranks and coupling rods. Arranged between the gear shaft 5 and the driving wheel axle 6 is a conical sleeve 8 which is movably connected on the one hand with the gear shaft 5 and on the other hand with the one driving wheel 7.

Each of said movable connecting devices consists, according to the invention, in the embodiment shown of two three pointed star-shaped wheels 9, 10 and 11, 12 respectively which are so displaced peripherally in relation to each other that the points of the one star-wheel will be located right between those of the other star-wheel. Arranged between each point of the one star-wheel and each point of the other star-wheel is a link 13 inserted in recesses in said points. Three of the links serve to transmit the power on forward running and the other three on backward running.

In the coupling shown to the left of Fig. 1, the star-wheel 9 is integral with the sleeve 8, whereas the star-wheel 10 is secured on the gear shaft 5. In this coupling the links will thus bear on the one hand against a part rigidly connected with the sleeve 8, viz the star-wheel 9, and on the other hand against a part rigidly connected with the gear shaft 5, viz the star-wheel 10. In the coupling shown to the right of Fig. 1 the star-wheel 11 is fixed on the sleeve 8, whereas the star-wheel 12 is integral with the driving wheel 7, the spokes of the driving wheels being provided with parts corresponding to the points. In this coupling the links 13 are thus caused to bear partly on the star-wheel 11 rigidly connected with the sleeve 8, and partly on members rigidly connected with the driving wheel 7.

In the embodiment shown in Figs. 1 and 2, each link 13 consists of a tube or the like 14 which in each end is enlarged to a greater inner diameter. Inserted in each of said enlarged spaces is an end member 15 of especially hard material, for instance hardened steel or the like. The end members are provided with heads 16, the outer surface of which is slightly spherical. Each point of the star-wheels is provided with two substantially cylindrical holes in which the end members 15 of the links are inserted, and further with a recess 17 shaped in section at right angles to the axis of the star-wheel as a frustum of a cone with the smaller base line directed inwardly (see Figs. 2 and 3). The outer portion of the point is U-shaped in axial section (see Fig. 1). Inserted in said recess is a block 18 of a corresponding shape, said block being provided with recesses having plates 19 inserted therein, which plates are made from especially hard material, for instance hardened steel, and serve as abutments for the end members 15 of the links. The block 18 is kept in place by a bolt 20 extending through the U-legs of the point and the block 18, said bolt being provided with a nut 21.

By forming in this manner the end members 15 of the links and the bearing plates 19 as separate parts, the advantage is obtained that said parts which are exposed to wear may be readily replaced besides which they may be made from especially hard material, without rendering the manufacture of other parts of the coupling difficult.

In the modified embodiment of the links shown in Fig. 3, each of the links is made in one piece, and provided at each end with a head 16 which in this case has a plane end surface. On the contrary, the outer surfaces of the bearing plates 19 inserted in the block 18 are slightly spherical outwards.

Said spherical surfaces, whether they be arranged on the links proper or on the bearing plates, are of such dimensions that a certain restoring power will be obtained in case the links have been turned out of their normal positions. For instance, in the embodiment shown in Figs. 1 and 2, the radius of curvature of the spherical surface should be greater than half the length of the link. Moreover, the spherical surfaces are preferably calculated in such a manner that no sliding movement but only a rolling movement will occur between the heads of the links and the bearing plates.

On a change in the relative positions between the toothed gearing and the driving wheels, the sleeve 8 will assume an oblique position in relation to the driving wheel axle 6 and the gear shaft 5. This oblique position of the sleeve is permitted on account of the presence of the two connecting devices above described; the star-wheels of each of said devices will then no longer be parallel to each other, but form a greater or smaller angle with each other. The individual links will then be turned out of the common plane in which they are located when the link coupling occupies its normal position. If for some reason or other, for instance when the vehicle passes over a rail joint, the right wheel 7, for example, would be raised and, consequently, the driving wheel axle 6 were caused to assume an oblique position, the two star-wheels 9, 10 of the left link coupling would be bent away from each other, that is, their planes would form an angle with each other and the links would assume a corresponding position.

The links also permit a mutual axial displacement of the sleeve 8, the driving wheel axle 6 and the gear shaft 5. On an axial displacement of the driving wheel axle 6 in relation to the gear shaft 5, the sleeve 8 will only be displaced half the distance of displacement of the driving wheel axle 6 in relation to the gear shaft.

In Fig. 4, 9 and 10 are the parts, the so called star-wheels, rigidly connected with the sleeve and with the driving wheel axle respectively, between which wheels the power is transmitted with the aid of the links. Arranged in said star-wheels are, as before, blocks 18 secured in the wheels by means of bolts 20. In the embodiment shown the link consists of a large part 30, between which and the blocks 18 a plurality of lens-shaped small plates 31 is arranged.

These plates 31 and, in this case, the part 30 have slightly spherical end surfaces which bear against one another, and the different parts are kept in place and guided radially by rings 32 and 33 surrounding the parts, said rings being so formed, however, as to permit a substantially rolling movement of the parts in relation to one another. The parts may, of course, also be kept in place in some other way, for instance by means of a single row of rings. The link terminates at opposite ends in plates 34, the one side of which is plane, and which plates are inserted in members 35 guided radially in relation to the star-wheels 9 and 10, by means of rings 36.

In Fig. 5 one end of a link is shown on an enlarged scale, and from this figure it will be clear how the rings 32 and 33 are arranged.

By means of links according to this embodiment several advantages are obtained beyond those entailed by constructions of known kind. Amongst these advantages may be mentioned that, on deviations from the normal position of the link, the rolling movements between the curved surfaces will be smaller, said movement being distributed to a greater number of places corresponding to the number of plates.

The surfaces which for practical reasons are preferably spherically formed, may be made with greater radii whereby on the one hand the effective bearing surface between the plates becomes greater and, on the other hand, the restoring power will be greater on deviations from the normal positions. By forming said bearing surfaces with different radii of curvature in different directions, different restoring powers may be obtained according to the direction, in which the link is brought out of its normal position. On account of the greater number of plates the axial resiliency of the link also becomes greater, as the power to be transmitted by the link is operative on a greater number of surfaces.

By suitable dimensioning the rings keeping the different parts together, that is, in the embodiment shown, the rings 32 and 33, said rings may also serve for limiting the deviations of the link.

What we claim as new and desire to secure by Letters Patent of the United States of America is:—

1. In locomotives and similar vehicles, a driving motor rigidly connected to the frame of the vehicle, a driving wheel axle, a toothed gearing for transmitting power from said driving motor onto said driving wheel axle, means for movably connecting said toothed gearing with said driving wheel axle, said means comprising a movable coupling consisting of lengthened members movably connected with said toothed gearing and said driving wheel axle and so arranged that transmission of power is effected through said members by pressure in the direction of their length.

2. In locomotives and similar vehicles, a driving motor rigidly connected to the frame of the vehicle, a driving wheel axle, a toothed gearing for transmitting power from said driving motor onto said driving wheel axle, means for movably connecting said toothed gearing with said driving wheel axle, said means comprising a part extending along said driving wheel axle and movable couplings for connecting said part with the toothed gearing and the driving wheel axle respectively, said couplings comprising lengthened members movably connected on the one hand with said part and on the other hand with said toothed gearing and said driving wheel axle respectively and so arranged that transmission of power is effected through said members by pressure in the direction of their length.

3. In locomotives and similar vehicles, a driving motor rigidly connected to the frame of the vehicle, a driving wheel axle, a toothed gearing for transmitting power from said driving motor onto said driving wheel axle, means for movably connecting said toothed gearing with said driving wheel axle, said means comprising a part extending along said driving wheel axle and movable couplings for connecting said part with the toothed gearing and the driving wheel axle respectively, said couplings comprising supporting links abutting on the one hand against said part and on the other hand against said toothed gearing and said driving wheel axle respectively and so arranged that transmission of power is effected through said members in the direction of their length.

4. In locomotives and similar vehicles, a driving motor rigidly connected to the frame of the vehicle, a driving wheel axle, a toothed gearing for transmitting power from said driving motor onto said driving wheel axle, means for movably connecting said toothed gearing with said driving wheel axle, said means comprising a sleeve surrounding said driving wheel axle and movable couplings for connecting said sleeve with the toothed gearing and the driving wheel axle respectively, said couplings comprising lengthened members movably connected on the one hand with said sleeve and on the other hand with said toothed gearing and said driving axle respectively and so arranged that transmission of power is effected through said members by pressure in the direction of their length.

5. In locomotives and similar vehicles, a driving motor rigidly connected to the frame of the vehicle, a driving wheel axle, a toothed gearing for transmitting power from said driving motor onto said driving wheel axle, means for movably connecting said toothed gearing with said driving wheel axle, said means comprising a part extending along said driving wheel axle and movable couplings for connecting said part with the toothed gearing and the driving wheel axle respectively, said couplings comprising lengthened members movably connected on the one hand with said part and on the other hand with said toothed gearing and said driving wheel axle respectively and so arranged that transmission of power is effected through said members by pressure in the direction of their length, said lengthened members forming a regular figure with the same center as the driving wheel axle.

6. In locomotives and similar vehicles, a driving motor rigidly connected to the frame of the vehicle, a driving wheel axle, a toothed gearing for transmitting power from said driving motor onto said driving wheel axle, means for movably connecting said toothed gearing with said driving wheel axle, said means comprising a part extending along said driving wheel axle and movable couplings for connecting said part with the toothed gearing and the driving wheel axle respectively, said couplings comprising each a group of lengthened members arranged in a circle around each end of said part, said members being movably connected on the one hand with said part and on the other hand with said toothed gearing and said driving wheel axle respectively and so arranged that transmission of power is effected through said members by pressure in the direction of their length.

7. In locomotives and similar vehicles, a driving motor rigidly connected to the frame of the vehicle, a driving wheel axle, a toothed gearing for transmitting power from said driving motor onto said driving wheel axle, means for movably connecting said toothed gearing with said driving wheel axle, said means comprising a part extending along said driving wheel axle and movable couplings for connecting said part with the toothed gearing and the driving wheel axle respectively, said couplings comprising each six lengthened members movably connected on the one hand with said part and on the other hand with said toothed gearing and said driving wheel axle respectively and so arranged that transmission of power is effected through said members by pressure in the direction of their length, three of said six members of each coupling operating on forward running and the other three on backward runnig.

8. In locomotives and similar vehicles, a driving motor rigidly connected to the frame of the vehicle, a driving wheel axle, a toothed gearing for transmitting power from said driving motor onto said driving wheel axle, means for movably connecting said toothed gearing with said driving wheel axle, said means comprising a part extending along said driving wheel axle and movable couplings for connecting said part with the toothed gearing and said driving wheel axle respectively, said couplings comprising each two three-pointed star-wheels, one of which is connected with said part and the other with said toothed gearing and said driving wheel axle respectively, and lengthened members connecting a star-point of the one star-wheel of each coupling with a star-point of the other star-wheel of said coupling, said members being so arranged that transmission of power is effected through same by pressure in the direction of their length.

9. In locomotives and similar vehicles, a driving motor rigidly connected to the frame of the vehicle, a driving wheel axle, a toothed gearing for transmitting power from said driving motor onto said driving wheel axle, means for movably connecting said toothed gearing with said driving wheel axle, said means comprising a part extending along said driving wheel axle and movable couplings for connecting said part with said toothed gearing and said driving wheel axle respectively, said coupling comprising lengthened members abutting on the one hand against said part and on the other hand against said toothed gearing and said driving wheel axle respectively and so arranged that transmission of power is effected through said members in the direction of their length, one of the bearing surfaces at the abutting places of said lengthened members being spherical.

10. In locomotives and similar vehicles, a driving motor rigidly connected to the frame of the vehicle, a driving wheel axle, a toothed gearing for transmitting power from said driving motor onto said driving wheel axle, means for movably connecting said toothed gearing with said driving wheel axle, said means comprising a part extending along said driving wheel axle and movable couplings for connecting said part with said toothed gearing and said driving wheel axle respectively, said coupling comprising lengthened members abutting on the one hand against said part and on the other hand against said toothed gearing and said driving wheel axle respectively and so arranged that transmission of power is effected through said members in the direction of their length, one of the bearing surfaces at the abutting places of said lengthened members having a spherical shape of such a curvature as to provide a restoring power, when said members are turned out of their normal positions.

11. In locomotives and similar vehicle, a driving motor rigidly connected to the frame of the vehicle, a driving wheel axle, a toothed gearing for transmitting power from said driving motor onto said driving wheel axle, means for movably connecting said toothed gearing with said driving wheel axle, said means comprising a part extending along said driving wheel axle and movable couplings for connecting said part with said toothed gearing and said driving wheel axle respectively, said coupling comprising lengthened members abutting on the one hand against said part and on the other hand against said toothed gearing and said driving wheel axle respectively and so arranged that transmission of power is effected through said members in the direction of their length, at least one of the lengthened members of each coupling consisting of a plurality of parts bearing against one another, one of the bearing surfaces between said parts having a curved shape.

12. In locomotives and similar vehicles, a driving motor rigidly connected to the frame of the vehicle, a driving wheel axle, a toothed gearing for transmitting power from said driving motor onto said driving wheel axle, means for movably connecting said toothed gearing with said driving wheel axle, said means comprising a part extending along said driving wheel axle and movable couplings for connecting said part with said toothed gearing and said driving wheel axle respectively, said coupling comprising lengthened members abutting on the one hand against said part and on the other hand against said toothed gearing and said driving wheel axle respectively and so arranged that transmission of power is effected through said members in the direction of their length, at least one of the lengthened members of each coupling consisting of a plurality of parts bearing against one another, one of the bearing surfaces between said parts having a curved shape of such a curvature that the radius of curvature of said surface is greater than the distance of said surface from the center of the member.

13. In locomotives and similar vehicles, a driving motor rigidly connected to the frame of the vehicle, a driving wheel axle, a toothed gearing for transmitting power from said driving motor onto said driving wheel axle, means for movably connecting said toothed gearing with said driving wheel axle, said means comprising a part extending along said driving wheel axle and movable couplings for connecting said part with said toothed gearing and with said driving wheel axle respectively, said coupling comprising lengthened members abutting on the one hand against said part and on the other hand against said toothed gearing and said driving wheel axle respectively and so arranged that transmission of power is effected through said members in the direction of their length, at least one of the lengthened members of each coupling consisting of a plurality of parts bearing against one another, one of the bearing surfaces between said parts being curved, and means for guiding said parts in radial direction with relation to one another.

14. In locomotives and similar vehicles, a driving motor rigidly connected to the frame of the vehicle, a driving wheel axle, a toothed gearing for transmitting power from said driving motor onto said driving wheel axle, means for movably connecting said toothed gearing with said driving wheel axle, said means comprising a part extending along said driving wheel axle and movable couplings for connecting said part with said toothed gearing and with said driving wheel axle respectively, said coupling comprising lengthened members abutting on the one hand against said part and on the other hand against said toothed gearing and said driving wheel axle respectively and so arranged that transmission of power is effected through said members in the direction of their length, at least one of the lengthened members of each coupling consisting of a plurality of parts bearing against one another, one of the bearing surfaces between said parts being curved, and means for guiding said parts in radial direction with relation to one another, said means comprising two rows of rings, one row surrounding the other, the rings of each row bearing against one another with such a play as to permit a rolling movement of said parts on one another.

15. In locomotives and similar vehicles, a driving motor rigidly connected to the frame of the vehicle, a driving wheel axle, driving wheels secured to said axle, a toothed gearing for transmitting power from said driving motor onto said driving wheel axle, means for movably connecting said toothed gearing with said driving wheel axle, said means comprising a sleeve surrounding said axle and movable couplings for connecting said sleeve with the toothed gearing and the driving wheel axle respectively, said coupling comprising each two three-pointed star-wheels, one of which is connected with said part and the other with said toothed gearing and said driving wheel respectively, and lengthened members abutting against a star-point of the one star-wheel of each coupling and a star-point of the other star-wheel of said coupling, said members being so arranged that transmission of power is effected through same in the direction of their length, the star-wheel connected with the driving wheel axle being integral with the corresponding driving wheel.

In testimony whereof we affix our signatures.

FREDRIK LJUNGSTRÖM.
ISIDOR BROBERG.
GÖSTA WAHLSTEN.